United States Patent
Zhang et al.

(10) Patent No.: US 11,434,872 B2
(45) Date of Patent: Sep. 6, 2022

(54) METHOD AND SYSTEM FOR CONTROLLING WIND TURBINE BASED ON SECTORS

(71) Applicant: BEIJING GOLDWIND SCIENCE & CREATION WINDPOWER EQUIPMENT CO., LTD., Beijing (CN)

(72) Inventors: Pengfei Zhang, Beijing (CN); Cheng Fang, Beijing (CN); Guilin Zhou, Beijing (CN); Minghui Wang, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 829 days.

(21) Appl. No.: 16/337,175

(22) PCT Filed: Jul. 10, 2018

(86) PCT No.: PCT/CN2018/095172
§ 371 (c)(1),
(2) Date: Mar. 27, 2019

(87) PCT Pub. No.: WO2019/148772
PCT Pub. Date: Aug. 8, 2019

(65) Prior Publication Data
US 2021/0340955 A1    Nov. 4, 2021

(30) Foreign Application Priority Data
Jan. 31, 2018 (CN) .......................... 201810096777.0

(51) Int. Cl.
*F03D 9/00* (2016.01)
*H02P 9/04* (2006.01)
(Continued)

(52) U.S. Cl.
CPC ........... *F03D 7/0292* (2013.01); *F03D 7/048* (2013.01); *F05B 2270/1033* (2013.01);
(Continued)

(58) Field of Classification Search
CPC .. F03D 7/0292; F03D 7/048; F05B 2270/204; F05B 2270/1033;
(Continued)

(56) References Cited

U.S. PATENT DOCUMENTS 8,068,939 B2 * 11/2011 Schmidt ................ F03D 7/0224
                                                      700/297
9,903,340 B2 *  2/2018 Ruiz Aldama ........ F03D 7/0224
(Continued)

FOREIGN PATENT DOCUMENTS

| CN | 101509468 A | 8/2009 |
| CN | 101881254 A | 11/2010 |

(Continued)

OTHER PUBLICATIONS

Extended European Search Report dated Dec. 20, 2019; Appln. No. 18863795.3.
(Continued)

*Primary Examiner* — Tulsidas C Patel
*Assistant Examiner* — Thomas K Quigley

(57) ABSTRACT

A method and a system for controlling a wind turbine based on sectors. Original sectors of the wind turbine are reconstructed based on a wind resource parameter and a wake-flow effect. A load is calculated and superposed for a new sector obtained from the sector reconstruction. An optimization algorithm is applied, under a condition that a constraint condition of a fatigue load is met, to find an operation parameter for maximum power generation amount of the wind turbine.

12 Claims, 2 Drawing Sheets

(51) Int. Cl.
*F03D 7/02* (2006.01)
*F03D 7/04* (2006.01)

(52) U.S. Cl.
CPC . *F05B 2270/1095* (2013.01); *F05B 2270/204* (2020.08); *F05B 2270/32* (2013.01); *F05B 2270/331* (2013.01); *F05B 2270/332* (2013.01); *F05B 2270/335* (2013.01)

(58) Field of Classification Search
CPC .......... F05B 2270/1095; F05B 2270/32; F05B 2270/331; F05B 2270/332; F05B 2270/335
See application file for complete search history.

(56) References Cited

U.S. PATENT DOCUMENTS

| | | | | |
|---|---|---|---|---|
| 9,958,528 | B2* | 5/2018 | Hawkins | F03D 7/0204 |
| 10,364,796 | B2* | 7/2019 | Brath | F03D 7/0224 |
| 10,677,220 | B2* | 6/2020 | Baba | F03D 7/0224 |
| 10,740,507 | B2* | 8/2020 | Saxena | F03D 13/30 |
| 10,815,972 | B2* | 10/2020 | Evans | F03D 17/00 |
| 2006/0131889 | A1* | 6/2006 | Corten | F03D 13/20 290/43 |
| 2006/0232073 | A1* | 10/2006 | Corten | F03B 15/06 290/44 |
| 2009/0206605 | A1* | 8/2009 | Schmidt | F03D 7/042 290/44 |
| 2010/0283245 | A1 | 11/2010 | Gjerlov et al. | |
| 2010/0283246 | A1* | 11/2010 | Christensen | F03D 7/0272 290/44 |
| 2011/0142619 | A1* | 6/2011 | Subramanian | F03D 7/028 416/31 |
| 2012/0301295 | A1 | 11/2012 | Mutius | |
| 2015/0176566 | A1* | 6/2015 | Ruiz Aldama | F03D 7/043 416/1 |
| 2016/0032897 | A1* | 2/2016 | Hawkins | G01S 3/54 342/417 |
| 2016/0230741 | A1* | 8/2016 | Brath | F03D 7/043 |
| 2017/0058871 | A1* | 3/2017 | Movsichoff | F03D 7/0224 |
| 2017/0321654 | A1* | 11/2017 | Zheng | F03D 7/0276 |
| 2020/0300227 | A1* | 9/2020 | Evans | F03D 17/00 |

FOREIGN PATENT DOCUMENTS

| | | |
|---|---|---|
| CN | 102305179 A | 1/2012 |
| CN | 104763585 A | 7/2015 |
| EP | 2249029 A2 | 11/2010 |
| WO | 03/106838 A1 | 12/2003 |
| WO | 2011/101079 A1 | 8/2011 |
| WO | 2011/157271 A2 | 12/2011 |

OTHER PUBLICATIONS

International Search Report dated Sep. 13, 2018; PCT/CN2018/095172.

* cited by examiner

METHOD AND SYSTEM FOR CONTROLLING WIND TURBINE BASED ON SECTORS

This application is the national phase of International Application No. PCT/CN2018/095172, titled "METHOD AND SYSTEM FOR CONTROLLING WIND TURBINE BASED ON SECTORS", filed on Jul. 10, 2018, which claims the priority to Chinese Patent Application No. 201810096777.0, titled "METHOD AND SYSTEM FOR CONTROLLING WIND TURBINE BASED ON SECTORS", filed on Jan. 31, 2018 with the State Intellectual Property Office of People's Republic of China, the content of which is incorporated herein by reference.

FIELD

The present disclosure relates to the field of wind power, and in particular, to a method and a system for controlling a wind turbine based on sectors.

BACKGROUND

The global energy crisis is increasingly evident. Thereby, developing a renewable energy source has become an important measure of energy development strategy for nations in the world. The wind power has become a renewable energy source which is widely researched, because wind energy has advantages of being plentiful, renewable, widespread and pollution-free.

In a case that the wind turbine operates in complicated landforms, landforms of sectors of the wind turbine have a great difference, which results in that wind resource conditions of the sectors differ greatly. Difference among wind resources of different sectors are not taken into consideration in a conventional strategy for controlling the wind turbine, thereby resulting in a lower economic performance of all the wind turbines in a wind farm.

SUMMARY

A method and a system for controlling a wind turbine based on sectors are provided according to the present disclosure.

According to an aspect of the present disclosure, a method for controlling a wind turbine based on sectors is provided, including: acquiring, for each of multiple wind speed ranges, a wind resource parameter of each of original sectors of the wind turbine; dividing, with an interval of a predetermined degree, each of the original sectors into multiple first sectors; acquiring a wind resource parameter of each of the multiple first sectors, based on the wind resource parameter of each of the original sectors of the wind turbine; calculating a comprehensive turbulent intensity of each of the multiple first sectors, for each of the multiple wind speed ranges, based on the wind resource parameter of each of the multiple first sectors and a wake-flow effect of the wind turbine; performing sector reconstruction to form multiple second sectors, and acquiring a wind resource parameter of each of the multiple second sectors and a comprehensive turbulent intensity of each of the multiple second sectors, based on the comprehensive turbulent intensity of each of the multiple first sectors; calculating a load of each of large components of the wind turbine, for each of the multiple wind speed ranges, based on an operation parameter of the wind turbine, the wind resource parameter of each of the multiple second sectors, the comprehensive turbulent intensity of each of the multiple second sectors, and an air density; superposing the load of each of the large components of the wind turbine, calculated for each of the multiple wind speed ranges, to acquire a fatigue load of each of the large components; and adjusting the operation parameter of the wind turbine and recalculating the comprehensive turbulent intensity of each of the multiple first sectors, under a constraint condition being the fatigue load of each of the large components, and an objective function being that a power generation amount of the wind turbine is maximum, serves as an objective function.

According to another aspect of the present disclosure, a system for controlling a wind turbine based on sectors is provided, which includes: a parameter acquisition module, configured to acquire, for each of multiple wind speed ranges, a wind resource parameter of each of original sectors of the wind turbine; a sector reassembly module, configured to divide, with an interval of a predetermined degree, each of the original sectors into multiple first sectors, and acquire a wind resource parameter of each of the multiple first sectors, based on the wind resource parameter of each of the original sectors of the wind turbine; a sector reconstruction module, configured to calculate a comprehensive turbulent intensity of each of the multiple first sectors, for each of the multiple wind speed ranges, based on the wind resource parameter of each of the multiple first sectors and a wake-flow effect of the wind turbine, and perform sector reconstruction to form multiple second sectors, and acquire a wind resource parameter of each of the multiple second sectors and a comprehensive turbulent intensity of each of the multiple second sectors, based on the comprehensive turbulent intensity of each of the multiple first sectors; a load calculation module, configured to calculate a load of each of large components of the wind turbine, for each of the multiple wind speed ranges, based on an operation parameter of the wind turbine, the wind resource parameter of each of the multiple second sectors, the comprehensive turbulent intensity of each of the multiple second sectors, and an air density; a fatigue load superposition module, configured to superpose the load of each of the large components of the wind turbine, calculated for each of the multiple wind speed ranges, to acquire a fatigue load of each of the large components; and a parameter adjustment module, configured to adjust the operation parameter of the wind turbine and provide the adjusted operation parameter of the wind turbine to the sector reconstruction module, under a constraint condition being the fatigue load of each of the large components, and an objective function being that a power generation amount of the wind turbine is maximum.

DETAILED DESCRIPTION OF EMBODIMENTS

Variations and embodiments may be made to the present disclosure. It should be appreciated that the present disclosure is not limited to the embodiments, and includes variations, modifications, and equivalents falling within the spirit and scope of the present disclosure. The terminology used in the embodiments of the present disclosure is intended for describing specific embodiments only, not to limit the embodiments. The singular forms used herein are intended to include the plural forms as well, unless the context clearly indicates otherwise.

Figure 1:
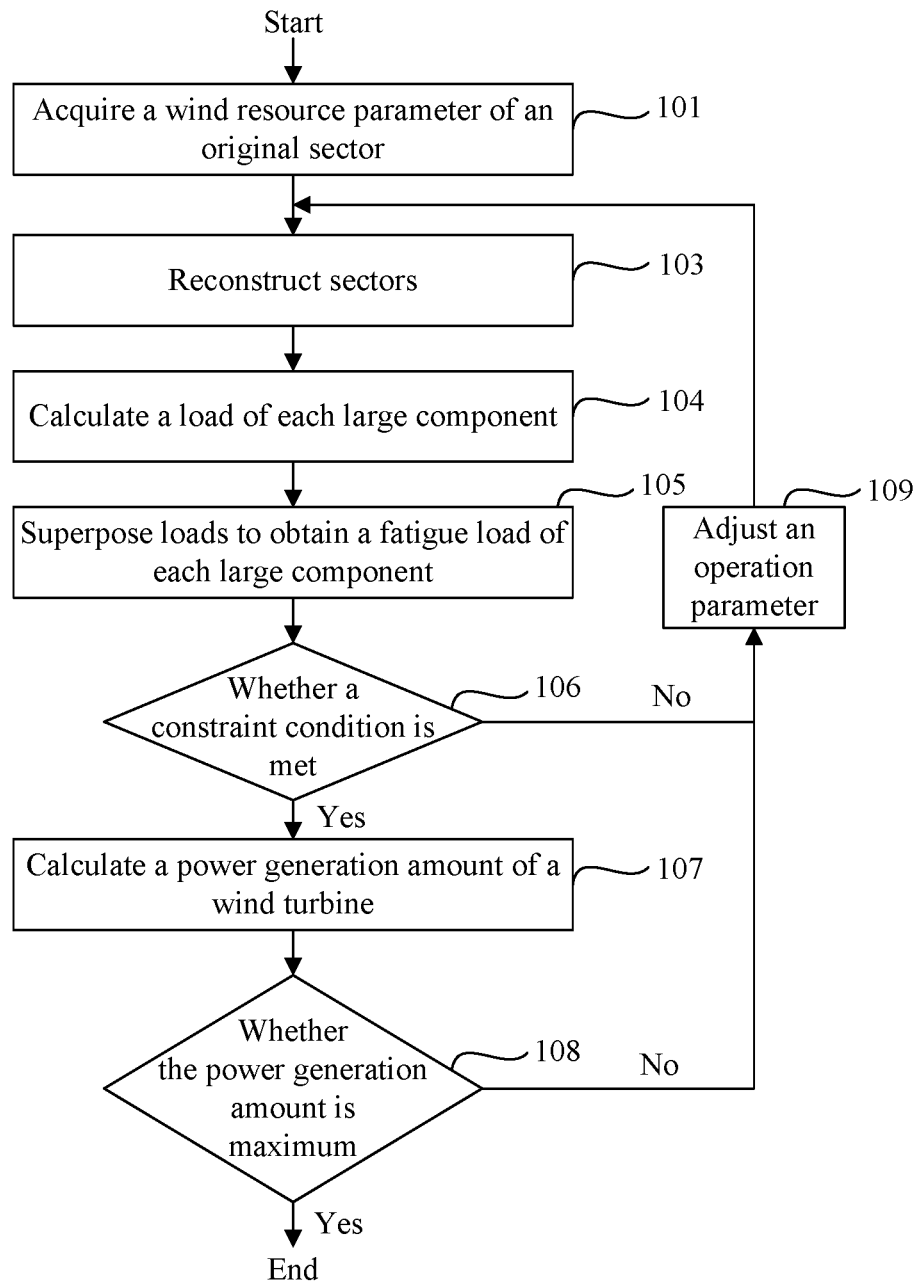
FIG. 1 is a flowchart of a method for controlling a wind turbine based on sectors according to an embodiment of the present disclosure.

FIG. 1 is a flowchart of a method for controlling a wind turbine based on sectors according to an embodiment of the present disclosure.

Reference is made to FIG. 1. In step 101, a wind resource parameter of each original sector of a wind turbine is acquired for each of multiple wind speed ranges.

According to an embodiment of the present disclosure, there may be multiple wind turbines in a wind farm. In the embodiment of the present disclosure, the method for controlling the wind turbine based on the sectors may be applied, in parallel or sequentially, to the multiple wind turbines in the wind farm. Hereafter control for one wind turbine is explained as an example for conciseness.

Original sectors of each wind turbine in the wind farm are generally 16 or 12 sectors acquired by division with an interval of 22.5° or 30°. For example, in case of 16 sectors, [0, 22.5, 45, . . . , 337.5] serves as centers of the sectors, respectively. In each embodiment of the present disclosure, a division manner for sectors is similar to the division manner for the 16 sectors.

According to an embodiment of the present disclosure, the wind resource parameter of each original sector of the wind turbine includes: a wind shear index, an inflow angle, an environment turbulent intensity of each wind speed range, a wind speed (for example, an average wind speed or a freestream wind speed), and a parameter of probability density distribution of wind speed (for example, a Weibull distribution parameter), of each sector. An environment turbulent intensity of each wind speed range may be recorded as an environment turbulent matrix. The environment turbulent matrix may be denoted by I.

$$I = \begin{bmatrix} a_{11} & a_{12} & \cdots & a_{1N} \\ a_{21} & a_{22} & \cdots & a_{2N} \\ \vdots & \ddots & & \vdots \\ a_{M1} & a_{M2} & \cdots & a_{MV} \end{bmatrix}$$

In the environment turbulent matrix I, environment turbulent intensities of N sectors for each of M wind speed ranges are recorded. For example, $a_{22}$ presents an environment turbulent intensity of the 2th sector for the 2th wind speed range of a wind turbine in the wind farm. Environment turbulent intensities of multiple wind turbines in the wind farm may recorded in a matrix. Those skilled in the art can appreciate that any other feasible form (for example, a set or a sequence) may be used to record the environment turbulent intensities. As a whole, the M wind speed ranges of the environment turbulent matrix I cover at least a range of $[V_{cutin}-s_1, V_{cutout}+s_2]$. That is, a wind speed range of $[V_{cutout}-s_1, V_{cutout}+s_2]$ may be divided into M wind speed ranges, so as to record the environment turbulent intensity of the wind turbine within each of the M wind speed ranges. $V_{cutin}$ represents a cut-in wind speed (a wind speed for startup), $V_{cutout}$ represents a cut-out wind speed (a wind speed for stopping a machine), and $s_1$ and $s_2$ represent margins of the wind speed range which may be considered additionally. For example, $s_1$ and $s_2$ may be 1 m/s and 5 m/s, respectively, which an embodiment of the present disclosure is not limited hereto. $s_1$ and $s_2$ may be other values based on engineering practice.

The aforementioned wind resource parameter is exemplary, and the concept of the present disclosure is not limited thereto. Fewer or more parameters may be included in the wind resource parameter. For example, the wind resource parameter may further include: a coordinate of a machine-location point and a model of the wind turbine in the wind farm.

Reference is further made to FIG. 1. In step 103, the original sectors are reconstructed based on the acquired wind resource parameter.

Specifically, the step 103 that the original sectors are reconstructed based on the acquired wind resource parameter includes following steps. Each original sector is divided, with an interval of a predetermined degree, into multiple first sectors. A wind resource parameter of each of the multiple first sectors is acquired based on the wind resource parameter of each original sector of the wind turbine.

For example, the original sectors are 12 sectors acquired by division with an interval of 30°. All of the 12 original sectors may be divided into the multiple first sectors with the interval of the predetermined degree (for example, 1°). Then, the wind resource parameter of each first sector of 1° is acquired based on the wind resource parameter of each of the 12 original sectors. For example, it is assumed that an original sector [345, 15] with a center at 0° has an environment turbulent intensity of 11% under a wind speed of 15 m/s. Thereby, such original sector is divided into 30 first sectors of 1°, and each of the 30 first sectors has an environment turbulent intensity of 11% under the wind speed of 15 m/s. Other wind resource parameter of each first sector may be acquired in a same manner.

In an embodiment, in a case that the original sector are 16 sectors acquired after division with an interval of 22.5°, all of the original sectors as a whole may be divided into multiple first sectors at the interval of the predetermined degree (for example, 1°). The concept of the present disclosure is not limited thereto. For example, each original sector may be divided, and an original sector [348.75, 11.25] with a center at 0° is divided with the interval of the predetermined degree (for example, 1°). Since a last one of the first sectors divided from the original sector [348.75, 11.25] does not meet the predetermined degree (for example, 1°), the last one of the first sectors divided from the original sector [348.75, 11.25] and a first one of the first sectors divided from a next adjacent original sector [11.25, 33.75] with a center at 22.5° are interpolated to acquire another first sector. Afterwards, a wind resource parameter of each of multiple first sectors is acquired based on the wind resource parameter of each original sector. The predetermined degree is not limited to 1° in the embodiment, and other suitable values may be selected based on engineering practice.

The step 103 that the original sectors are reconstructed based on the acquired wind resource parameter may further include following steps. A comprehensive turbulent intensity of each of the multiple first sectors is calculated respectively for each wind speed range, based on the wind resource parameter of each of the multiple first sectors and a wake-flow effect of the wind turbine. Based on the comprehensive turbulent intensity of each of the multiple first sectors, sector reconstruction is performed to form multiple second sectors, and a wind resource parameter and a comprehensive turbulent intensity of each of the multiple second sectors are acquired.

Similar to the description of the step 101, the wind resource parameter of each of the first sectors and second sectors of the wind turbine include: a wind shear index, an inflow angle, an environment turbulent intensity of each wind speed range, a wind speed, and a parameter of probability density distribution of wind speed (for example, a Weibull distribution parameter), of each sector.

In an embodiment of the present disclosure, that the comprehensive turbulent intensity of each first sector is calculated includes following steps. An additional turbulent intensity of the wind turbine is calculated based on the wake-flow effect of the wind turbine. The comprehensive turbulent intensity of each of the multiple first sectors is calculated respectively for each of the wind speed ranges, based on the additional turbulent intensity and the environment turbulent intensity of each wind speed range.

For example, according to the aforementioned environment turbulent matrix, it can be seen that the original sectors have corresponding environment turbulent intensities for different wind speed ranges. Therefore, multiple first sectors have corresponding environment turbulent intensities for different wind speed ranges. In the embodiment of the present disclosure, the additional turbulent intensity and the comprehensive turbulent intensity of each first sector are calculated for each of the all wind speed ranges (for example, the aforementioned M wind speed ranges).

Those skilled in the art can appreciate that a model for the wake-flow effect of the wind turbine may be created via various methods. The detailed description thereof is omitted herein for conciseness.

The additional turbulent intensity generated by the environment turbulent intensity and the wake-flow effect is taken into consideration. For each first sector of the wind turbine, the comprehensive turbulent intensity I' of the first sector of the wind turbine is calculated according to the following equation (1).

$$I' = \sqrt{I_a^2 + I_{add}^2} \quad (1)$$

In equation (1), $I_a$ represents the environment turbulent intensity of the first sector of the wind turbine, and $I_{add}$ represents the additional turbulent intensity of the wind turbine generated by the wake-flow effect.

According to the above method, the comprehensive turbulent intensity of each of the multiple first sectors is calculated respectively for each wind speed range. Then, sectors of which the comprehensive turbulent intensities are approximate and the locations are adjacent, in the multiple first sectors, are merged, so that the multiple second sectors are formed.

For example, several adjacent first sectors (several first sectors of 1° which are adjacent in orientation) of which the comprehensive turbulent intensities have a difference within a value approximating 0.05 or another predetermined value, in the multiple first sectors, are merged to form a second sector. In the embodiment of the present disclosure, an angle covered by each of the formed multiple second sectors is larger than or equal to a predetermined threshold angle (for example, 15°). That is, the angle covered by each formed second sector is at least 15° or more. The concept of the present disclosure is not limited thereto, and other suitable values can be selected based on engineering practice for the difference among the comprehensive turbulent intensities and for the predetermined threshold angle. According to the embodiment of the present disclosure, the sectors are adaptively divided according to an actual condition of wind resource of each wind turbine in the wind farm, instead of being uniformly divided with the interval of 22.5° or 20° for all of the wind turbines in the wind farm. Thereby, the condition of wind resource of different wind turbines in the wind farm and the wake-flow effect among wind turbines are finely evaluated.

Afterwards, a wind resource parameter and a comprehensive turbulent intensity of each of the multiple second sectors are acquired.

For each second sector, an average wind speed and a parameter of probability density distribution of wind speed may be recalculated based on various methods, which are not specifically limited herein. In an embodiment of the present disclosure, a maximum inflow angle and a maximum wind shear index, among multiple first sectors that are merged into one second sector, may serve as an inflow angle and a wind shear index of the second sector after merging. The concept of the present disclosure is not limited thereto.

In an embodiment of the present disclosure, the comprehensive turbulent intensity of each of the multiple second sectors may be an average of comprehensive turbulent intensities of the multiple first sectors that are merged. The concept of the present disclosure is not limited thereto.

After the step 103 is performed, an optimization for a power generation amount of the wind turbine being maximum is performed based on the reconstructed sector. Reference is further made to FIG. 1, where the optimization may include steps 104 to 109.

In step 104, a load of each large component of the wind turbine is calculated respectively for each wind speed range, based on an operation parameter of the wind turbine, the wind resource parameter of each of the multiple second sectors, the comprehensive turbulent intensity of each of the multiple second sectors, and the air density.

In an embodiment of the present disclosure, the operation parameter of the wind turbine may include, for example, a rated power, a rated rotation speed, and a cut-out wind speed. For example, the load of each large component of the wind turbine may be calculated via a load calculator or a load database. In an embodiment of the present disclosure, the load of the large component such as a tower bottom, a tower top, a rotatable hub, a fixed hub, a blade root, and a yaw, may be calculated and outputted via the load calculator (or the load database) from inputs. The inputs are the air density, the operation parameter such as the rated power rating, the rated rotational speed, and the cut-out wind speed, and the comprehensive turbulent intensity, the wind speed, the Weibull distribution parameter, the inflow angle, and the wind shear index of each second sector for each wind speed range.

Reference is further made to FIG. 1. In step 105, the load of each large component of the wind turbine, calculated for each wind speed range, is superposed to acquire a fatigue load of each large component. For example, in a case that the large component is the tower bottom, the fatigue load of the tower bottom is acquired based on a theory of fatigue damage accumulation, by superposing the loads of the tower bottom under the multiple wind speed ranges. Similarly, the fatigue loads of large components such as the tower top, the rotatable hub, the fixed hub, the blade root, and the yaw are acquired.

Afterwards, the operation parameter of the wind turbine is adjusted under a constraint condition being the fatigue load of each large component, and an objective function being that the power generation amount of the wind turbine is maximum. Then, the method goes back to that the comprehensive turbulent intensity of each first sector is calculated, of the step 103.

Specifically, in step 106, it is determined that whether the fatigue load of each of the large components is less than a predetermined threshold (for example, 1.05 times of a design value). In a case that the fatigue load of at least one of the large components is larger than the predetermined threshold, the method goes to step 109 to adjust the operation parameter of the wind turbine, and then goes to the step 103 in which the comprehensive turbulent intensity of each first sector is calculated. That is, in a case that there is a large component having an excessive fatigue load among all the large components of the wind turbine, the control for the wind turbine (the operation parameter of a first wind turbine) may result in a risk in operation of the wind turbine. Hence, it is required to readjust the operation parameter of the wind turbine. In a case that the operation parameter of the wind turbine is adjusted, the rated power as well as other parameters change, and a thrust coefficient changes accordingly. The wake-flow effect in the wind farm changes according to the description of the step 103, thereby resulting in a change in the additional turbulent intensity. Hence, it is required to go to step 103 to recalculate the additional turbulent intensity and the comprehensive turbulent intensity, and reconstruct the sector to form multiple second sectors again.

In a case that it is determined in the step 106 that the fatigue load of each of the large components of the wind turbine is less than the predetermined threshold, the method goes to step 107 to calculate the power generation amount of the wind turbine. In step 108, it is determined whether the power generation amount of the wind turbine reaches maximum. In a case that the power generation amount is not maximum in the step 108, the method goes to step 109 to adjust the operation parameter of the wind turbine, and then goes to the step 103 in which the comprehensive turbulent intensity of each of the first sectors is calculated.

In a case that it is determined in step 108 that the power generation amount is maximum, the optimization ends. The wind turbine is controlled according to the operation parameter which makes the power generation amount of the wind turbine in the wind farm maximum, that is, according to a result of the optimization.

In the embodiment of the present disclosure, the optimization may be performed by optimizing via a particle swarm optimization algorithm or a genetic algorithm, to adjust the operation parameter. Under the condition that the constraint of the fatigue load is met, the optimization finds an operation parameter for an optimum economic performance (i.e., the maximum power generation amount) for each wind turbine in the wind farm, and controls each wind turbine in the wind farm according to the result of the optimization.

With the method for controlling the wind turbine based on the sectors according to the embodiment of the present disclosure, the sector division, the optimization and the operation control are performed according to the actual condition of wind resource of each wind turbine in the wind farm, instead of that the sectors are uniformly divided and controlled for all of the wind turbines in the wind farm with an interval of 22.5° or 20°. Thereby, the condition of wind resource of different wind turbines in the wind farm and the wake-flow effect among wind turbines are finely evaluated. Power generating capability of each wind turbine in the wind farm is fully developed. The optimum economic performance is realized on the premise of guaranteeing the security of the wind turbine.

Figure 2:
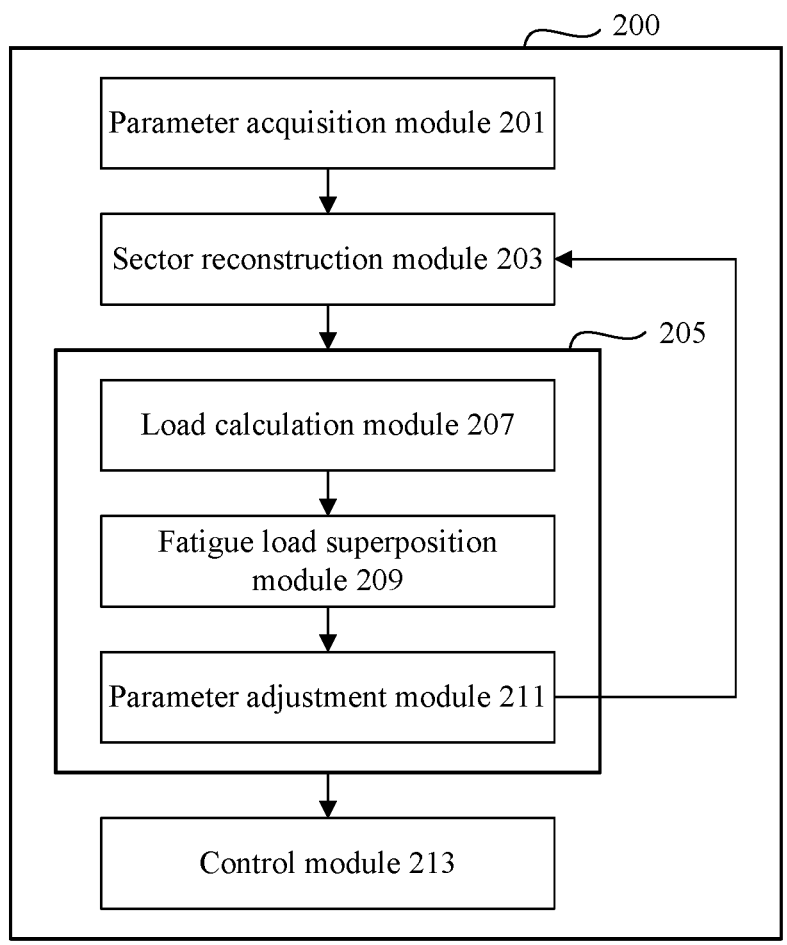
FIG. 2 is a block diagram of a system for controlling a wind turbine based on sectors according to an embodiment of the present disclosure.

FIG. 2 is a block diagram of a system for controlling a wind turbine based on sectors according to an embodiment of the present disclosure.

Reference is made to FIG. 2. A system 200 for controlling a wind turbine based on sectors according to an embodiment of the present disclosure includes: a parameter acquisition module 201, a sector reconstruction module 203, an optimization module 205, and a control module 213.

The parameter acquisition module 201 may be configured to acquire, for each of multiple wind speed ranges, a wind resource parameter of each original sector of the wind turbine. Specifically, the parameter acquisition module 201 may perform the operation described in the step 101 as shown in FIG. 1. A detailed description is omitted for conciseness.

The sector reconstruction module 203 may be configured to reconstruct the original sector based on the acquired wind resource parameter. Specifically, the sector reconstruction module 203 may be configured to: divide each of the original sectors, with an interval of a predetermined degree, to form multiple first sectors; acquire a wind resource parameter of each of the multiple first sectors, based on the wind resource parameter of each original sector of the wind turbine; calculate an comprehensive turbulent intensity of each of the multiple first sectors, respectively for each of the wind speed ranges, based on the wind resource parameter of each of the multiple first sectors and a wake-flow effect of the wind turbine; perform sector reconstruction to form multiple second sectors, and acquire a wind resource parameter and an comprehensive turbulent intensity of each of the multiple second sectors, based on the comprehensive turbulent intensity of each of the multiple first sectors. The sector reconstruction module 203 may perform the operation described in the step 103 as shown in FIG. 1. A detailed description is omitted for conciseness.

The optimization module 205 may be configured to perform an optimization for a power generation amount of the wind turbine being maximum, based on sectors after reconstructing.

Reference is made to FIG. 2. The optimization module 205 includes: a load calculation module 207, a fatigue load superposition module 209, and a parameter adjustment module 211. According to an embodiment of the present disclosure, the load calculation module 207, the fatigue load superposition module 209 and the parameter adjustment module 211, which are included in the optimization module 205, may be individual modules which are separate from each other, or may be a processing unit implemented in one or more processors. The present disclosure is not limited thereto.

The load calculation module 207 may be configured to calculate a load of each large component of the wind turbine, respectively for each of the wind speed ranges, based on an operation parameter of the wind turbine, the wind resource parameter of each of the multiple second sectors, the comprehensive turbulent intensity of each of the multiple second sectors, and an air density. Specifically, the load calculation module 207 may perform the operation described in the step 104 as shown in FIG. 1. A detailed description is omitted for conciseness.

The fatigue load superposition module 209 may be configured to superpose the load of each large component of the wind turbine, calculated for each wind speed range, to acquire a fatigue load of each large component. Specifically, the fatigue load superposition module 209 may perform the operation described in the step 105 as shown in FIG. 1. A detailed description is omitted for conciseness.

The parameter adjustment module 211 may be configured to adjust the operation parameter of the wind turbine and provide the adjusted operation parameter of the wind turbine to the sector reconstruction module 203, under a constraint condition being the fatigue load of each large component, and an objective function being that the power generation amount of the wind turbine is maximum. Specifically, the parameter adjustment module 211 performs the operation described in the steps 106 to 109 as shown in FIG. 1. A detailed description is omitted for conciseness.

In a case that the optimization module 205 finds, on the premise that the constraint condition is met, a sector division and an operation parameter for the maximum power generation amount of the wind turbine, the control module 213 is configured to control the wind turbine based on a result of optimization of the optimization module 205.

With the method and the system for controlling the wind turbine based on the sectors according to the embodiment of the present disclosure, the sector division, the optimization and the operation control are performed according to the actual condition of the wind resource of each wind turbine in the wind farm. Thereby, the condition of wind resource of different wind turbines in the wind farm and the wake-flow effect among the wind turbines are finely evaluated. The power generating capability of each of the wind turbines in the wind farm is fully developed. The optimum economic performance is realized on the premise of guaranteeing the security of the wind turbine.

According to the embodiment of the concept of the present disclosure, steps of the method described in FIG. 1, and the modules and operations thereof described in FIG. 2, may be coded in a program or software. The program or the software may be coded in any programming language based on the block diagram and the flowchart shown in the drawings, and the corresponding description in the specification. In an embodiment, the program or the software may include a machine code which can be directly executed by one or more processors or computers, for example, a machine code produced by a compiler. In another embodiment, the program or the software may include a higher-level code which can be executed by one or more processors or computers using an interpreter. The program or the software may be recorded, stored, or fixed in one or more non-transitory computer readable storage media. In an embodiment, the program, the software or the one or more non-transitory computer readable storage media may be distributed in a computer system.

According to the embodiment of the concept of the present disclosure, steps of the method described in FIG. 1, and the modules and operations thereof described in FIG. 2, may be implemented on a computing apparatus including a processor and a memory. The memory stores program instructions configured to control the processor to achieve operations of aforementioned modules.

The invention claimed is:

1. A method for controlling a wind turbine based on sectors, comprising:
    acquiring, for each of a plurality of wind speed ranges, a wind resource parameter of each of a plurality of original sectors of the wind turbine;
    constructing a plurality of new sectors, based on the acquired wind resource parameter;
    performing an optimization on power generation of the wind turbine based on the plurality of new sectors, to obtain a maximum power generation; and
    controlling the wind turbine based on a result of the optimization,
    wherein constructing the plurality of new sectors based on the acquired wind resource parameter comprises:
        dividing, with an interval of a predetermined degree, each of the plurality of original sectors to form a plurality of first sectors;
        acquiring a wind resource parameter of each of the plurality of first sectors, based on the wind resource parameter of each of the plurality of original sectors of the wind turbine;
        calculating a comprehensive turbulent intensity of each of the plurality of first sectors, respectively for each of the plurality of wind speed ranges, based on the wind resource parameter of each of the plurality of first sectors and a wake-flow effect of the wind turbine; and
        forming a plurality of second sectors, and acquiring a wind resource parameter of each of the plurality of second sectors and a comprehensive turbulent intensity of each of the plurality of second sectors, based on the comprehensive turbulent intensity of each of the plurality of first sectors, wherein the plurality of second sectors serve as the plurality of new sectors.

2. The method according to claim 1, wherein performing the optimization on power generation of the wind turbine based on the plurality of new sectors to obtain the maximum power generation comprises:
    calculating a load of each of a plurality of large components of the wind turbine, respectively for each of the plurality of wind speed ranges, based on an operation parameter of the wind turbine, the wind resource parameter of each of the plurality of second sectors, the comprehensive turbulent intensity of each of the plurality of second sectors, and an air density;
    superposing the load of each of the plurality of large components of the wind turbine, calculated for each of the plurality of wind speed ranges, to acquire an estimated fatigue load of each of the plurality of large components;
    in a case that the estimated fatigue load of at least one of the large components of the wind turbine is larger than a predetermined threshold,
        adjusting the operation parameter of the wind turbine for safe operation of the wind turbine and recalculating the comprehensive turbulent intensity of each of the plurality of first sectors; and
    in a case that the estimated fatigue load of each of the large components of the wind turbine is less than a predetermined threshold,
        calculating a power generation amount of the wind turbine; and
        adjusting the operation parameter of the wind turbine for obtaining the maximum power generation and recalculating the comprehensive turbulent intensity of each of the plurality of first sectors, in a case that the power generation amount of the wind turbine has not reached the maximum power generation.

3. The method according to claim 1, wherein the wind resource parameter comprises a wind shear index, an inflow angle, an environment turbulent intensity of each of the plurality of wind speed ranges, a wind speed, and a parameter of probability density distribution of wind speed.

4. The method according to claim 1, wherein calculating the comprehensive turbulent intensity of each of the plurality of first sectors, respectively for each of the plurality of wind speed ranges, based on the wind resource parameter of each of the plurality of first sectors and the wake-flow effect of the wind turbine, comprises:
    calculating, based on the wake-flow effect of the wind turbine, an additional turbulent intensity of the wind turbine; and
    calculating a comprehensive turbulent intensity of each of the plurality of first sectors, respectively for each of the plurality of wind speed ranges, based on the additional turbulent intensity and an environment turbulent intensity of each of the plurality of wind speed ranges.

5. The method according to claim 1, wherein forming the plurality of second sectors, based on the comprehensive turbulent intensity of each of plurality of first sectors, comprises:
merging ones of the plurality of first sectors, to form the plurality of second sectors, wherein the comprehensive turbulent intensities of the ones of the plurality of first sectors are approximate to each other, and the ones of the plurality of first sectors are adjacent in location;
wherein an angle covered by each of the plurality of second sectors is larger than or equal to a predetermined threshold angle.

6. A system for controlling a wind turbine based on sectors, comprising a non-transitory memory storing computer instructions and a processor, wherein the computer instructions when executed by the processor cause the processor to:
acquire, for each of a plurality of wind speed ranges, a wind resource parameter of each of a plurality of original sectors of the wind turbine;
construct a plurality of new sectors based on the acquired wind resource parameter;
perform an optimization on power generation of the wind turbine based on the plurality of new sectors, to obtain a maximum power generation; and
control the wind turbine based on a result of the optimization,
wherein the computer instructions when executed by the processor further cause the processor to:
divide, with an interval of a predetermined degree, each of the plurality of original sectors to form a plurality of first sectors;
acquire a wind resource parameter of each of the plurality of first sectors, based on the wind resource parameter of each of the plurality of original sectors of the wind turbine;
calculate a comprehensive turbulent intensity of each of the plurality of first sectors, respectively for each of the plurality of wind speed ranges, based on the wind resource parameter of each of the plurality of first sectors and a wake-flow effect of the wind turbine; and
form a plurality of second sectors, and acquire a wind resource parameter of each of the plurality of second sectors and a comprehensive turbulent intensity of each of the plurality of second sectors, based on the comprehensive turbulent intensity of each of the plurality of first sectors, wherein the plurality of second sectors serve as the plurality of new sectors.

7. The system according to claim 6, wherein the computer instructions when executed by the processor further cause the processor to:
calculate a load of each of a plurality of large components of the wind turbine, respectively for each of the plurality of wind speed ranges, based on an operation parameter of the wind turbine, the wind resource parameter of each of the plurality of second sectors, the comprehensive turbulent intensity of each of the plurality of second sectors, and an air density;
superpose the load of each of the plurality of large components of the wind turbine, calculated for each of plurality of the wind speed ranges, to acquire an estimated fatigue load of each of the large components;
in a case that the estimated fatigue load of at least one of the large components of the wind turbine is larger than a predetermined threshold,
adjust the operation parameter of the wind turbine for safe operation of the wind turbine and recalculate the comprehensive turbulent intensity of each of the plurality of first sectors; and
in a case that the estimated fatigue load of each of the large components of the wind turbine is less than a predetermined threshold,
calculate a power generation amount of the wind turbine; and
adjust the operation parameter of the wind turbine for obtaining the maximum power generation and recalculate the comprehensive turbulent intensity of each of the plurality of first sectors, in a case that the power generation amount of the wind turbine has not reached the maximum power generation.

8. The system according to claim 6, wherein the wind resource parameter comprises a wind shear index, an inflow angle, an environment turbulent intensity of each of the plurality of wind speed ranges, a wind speed, and a parameter of probability density distribution of wind speed.

9. The system according to claim 6, wherein the computer instructions when executed by the processor further cause the processor to:
calculate, based on the wake-flow effect of the wind turbine, an additional turbulent intensity of the wind turbine; and
calculate a comprehensive turbulent intensity of each of the plurality of first sectors, respectively for each of the plurality of wind speed ranges, based on the additional turbulent intensity and an environment turbulent intensity of each of the plurality of wind speed ranges.

10. The system according to claim 6, wherein the computer instructions when executed by the processor further cause the processor to:
merge ones of the first sectors, to form the plurality of second sectors, wherein the comprehensive turbulent intensities of the ones of the plurality of first sectors are approximate to each other, and the ones of the plurality of first sectors are adjacent in location;
wherein an angle covered by each of the plurality of second sectors is larger than or equal to a predetermined threshold angle.

11. A non-transitory computer readable storage medium, storing program instructions, wherein the program instructions when executed by a processor configure the processer to execute the method for controlling the wind turbine according to claim 1.

12. A computing device, comprising:
a processor; and
a non-transitory memory storing program instructions, wherein the program instructions when executed by a processor configure the processer to execute the method for controlling the wind turbine according to claim 1.

* * * * *